Dec. 24, 1940.　　　R. H. STARRETT　　　2,226,080
WELDING ELECTRODE
Original Filed July 19, 1938
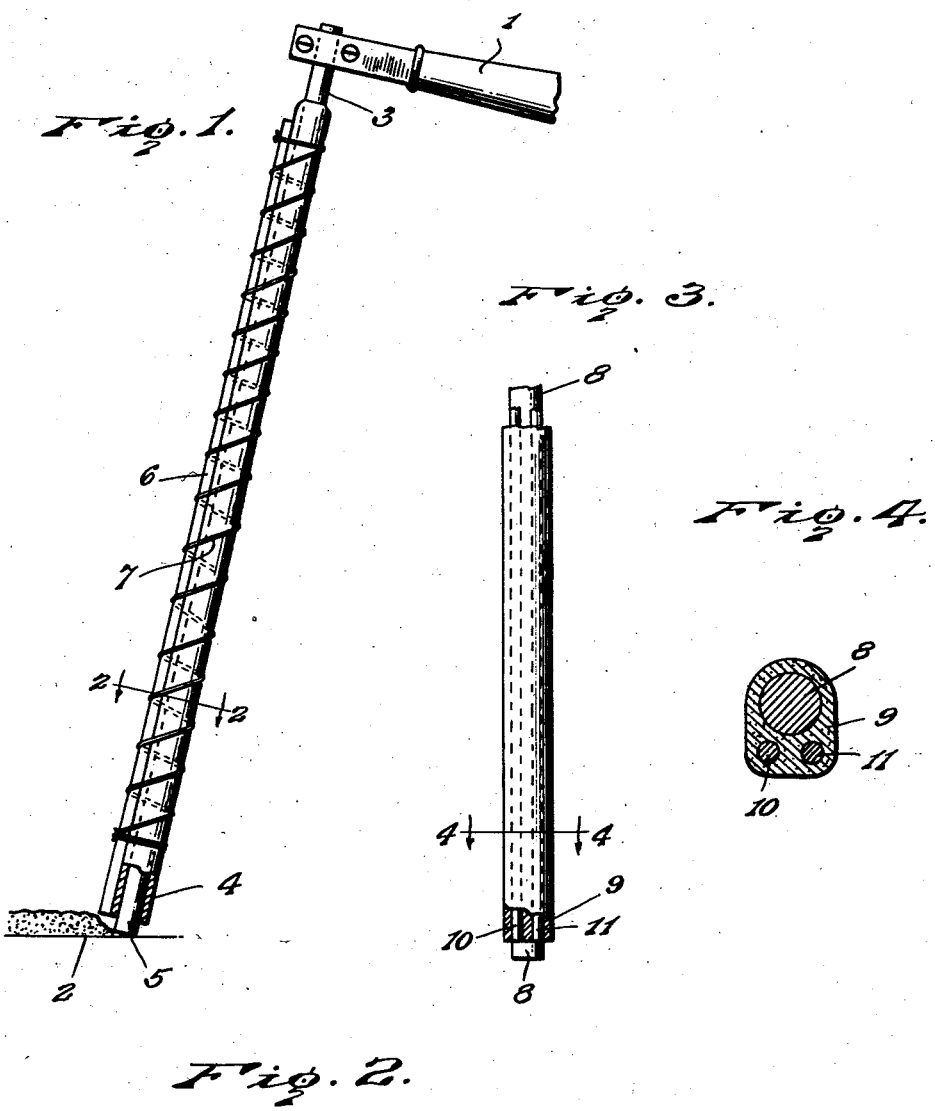
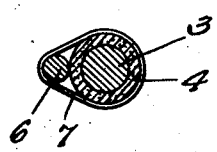

Patented Dec. 24, 1940

2,226,080

UNITED STATES PATENT OFFICE 2,226,080

WELDING ELECTRODE

Ralph H. Starrett, Manhattan, Ill.

Application July 19, 1938, Serial No. 220,058
Renewed May 15, 1940

2 Claims. (Cl. 219—8)

This invention relates to an improved welding electrode.

One of the principal objects of the invention is to provide an improved welding electrode which will be effective in use for permitting the completion of a welding operation with the utmost speed and efficiency.

Another object of the invention is to provide a welding electrode which will deposit a larger amount of weld metal during a welding operation so that a higher amperage welding current may be used without danger of overheating or burning the weld metal.

A further object of the invention is to provide a device of this character wherein a trailer rod is employed which trailer rod is insulated from the welding electrode itself by a suitable layer of flux and which is effectively secured to said electrode by means of the flux or a binding cord.

Another object of the invention is to provide a welding electrode, the trailer rod of which will be effective for keeping the molten metal at the welding point at a somewhat lower temperature but which will not affect the penetration of heat into the base metal directly beneath the welding arc.

And as a still further object, the invention seeks to provide a welding electrode, the trailer rod of which is so constructed and mounted that it will not interfere with the proper operation of the electrode.

Other and incidental objects of the invention, not called to attention hereinbefore, will become apparent during the course of the following description.

My invention is illustrated in the accompanying drawing forming a part of my application and in said drawing:

Figure 1 is a side elevation, partly shown in section, of my improved welding electrode.

Figure 2 is a horizontal sectional view on the line 2—2 of Figure 1, looking in the direction indicated by the arrows.

Figure 3 is a side elevation of a slightly modified form of the invention, partly broken away and shown in section.

Figure 4 is a horizontal sectional view on the line 4—4 of Figure 3, looking in the direction indicated by the arrows.

Reference is now had more specifically to the accompanying drawing wherein, as will be readily understood, similar numerals of reference designate like parts throughout the several views. The numeral 1 indicates the free end portion of an electrode holder and the numeral 2, generally, a surface to be welded.

My improved welding electrode includes a body 3 which is relatively long and is formed of current carrying metal. The electrode 3 has a sheath or coating 4 which extends throughout the major portion of the length thereof but terminates short of the holder 1, at its upper end, and short of the bottom end 5 of said electrode. The sheath is formed of insulating material and entirely encircles the electrode.

Associated with the body 3 and sheath 4 is a trailer rod 6 which is secured to the body and sheath by means of a cord 7 wrapped about the sheath and trailer rod. The trailer rod, as will be seen, is located in parallel spaced relation to the body 3 and terminates short of the upper end of the body as well as the upper end of the sheath 4. In view of this fact, turning of the electrode to any desired position in the holder may be readily effected. The trailer rod extends throughout the major portion of the length of the body and terminates short of the lower end thereof. In view of the fact that the trailer rod is insulated from the body 3 by means of the sheath 4, no electric current will be carried by said trailer rod. Moreover, by reason of the location of the trailer rod, said trailer rod will be kept cooler and will maintain the molten metal puddle at the end of the electrode at a somewhat lower temperature. The penetration of heat from the electric arc into the base metal directly beneath the arc, for effecting the welding operation, will not be affected. Moreover, due to the fact that the trailer rod is insulated from the body 3, a higher value of current may be carried by the electrode without resulting in overheating or burning the weld metal, which would otherwise take place, due to the trailer rod melting away from the body when it comes in contact with the puddle of molten metal.

Attention is called to the fact that, as the trailer rod terminates short of the end 5 of the body 3, a puddle of molten metal will be allowed to form before the trailer rod comes in contact with any part of the weld metal during a welding operation.

It is thought that the construction and operation of this form of the invention will now be thoroughly understood so that further description is believed unnecessary.

Referring now to the modification of the invention as shown in Figures 3 and 4 of the drawing, the body is shown at 8. The body is surrounded by a coating or sheath of insulating material 9 and embedded in the coating of insulating material are trailer rods 10 and 11. The trailer rods are disposed in parallel spaced relation to each other and to the body, 8 and, like the trailer rod 6 of the preferred form of the invention, they extend throughout the major portion of said body, terminating a short distance from the lower end thereof and a greater distance from the upper end of the body. The use of a pair of trailer rods differs only from the use of one rod in that a greater amount of heat will be absorbed. The modification performs in a like manner with the preferred form and further description is thought unnecessary.

Having thus described the invention, what I claim is:

1. A welding electrode including a body, and heat absorbing means connected with the body and cooperating therewith to absorb a certain amount of heat from the molten metal during a welding operation whereby the effectiveness and life of the electrode will be increased, said heat absorbing means terminating short of the lower end of the body for permitting the formation of a puddle of molten metal prior to engagement by said heat absorbing means.

2. In a welding electrode, a body having an upper end engageable in an electrode holder, a sheath of insulating material surrounding the body throughout the major portion of its length, a trailer rod carried by the body against the sheath, said trailer rod absorbing heat from a puddle of molten metal during a welding operation whereby the temperature of the puddle of molten metal will be lowered and overheating thereof prevented, said lower end of the body extending below the lower end of the trailer rod for permitting the formation of a puddle of molten metal prior to engagement by the trailer rod.

RALPH H. STARRETT.